United States Patent
Chakrabarty

(10) Patent No.: US 9,644,467 B2
(45) Date of Patent: May 9, 2017

(54) RECOVERY FROM A HYDROCARBON RESERVOIR

(71) Applicant: Tapantosh Chakrabarty, Calgary (CA)

(72) Inventor: Tapantosh Chakrabarty, Calgary (CA)

(73) Assignee: ExxonMobil Upstream Research Company, Spring, TX (US)

(*) Notice: Subject to any disclaimer, the term of this patent is extended or adjusted under 35 U.S.C. 154(b) by 156 days.

(21) Appl. No.: 14/477,494

(22) Filed: Sep. 4, 2014

(65) Prior Publication Data
US 2015/0176383 A1    Jun. 25, 2015

(30) Foreign Application Priority Data

Dec. 19, 2013    (CA) .................................. 2837646

(51) Int. Cl.
*E21B 43/24*    (2006.01)
*E21B 43/30*    (2006.01)
*C09K 8/592*    (2006.01)

(52) U.S. Cl.
CPC .......... *E21B 43/2408* (2013.01); *C09K 8/592* (2013.01); *E21B 43/30* (2013.01)

(58) Field of Classification Search
CPC ...... E21B 43/24; E21B 43/2408; E21B 43/16; E21B 43/2406; C09K 8/592; C09K 8/58
See application file for complete search history.

(56) References Cited

U.S. PATENT DOCUMENTS

| 3,292,702 A | 12/1966 | Boberg ........................... 166/40 |
| 3,739,852 A | 6/1973 | Woods et al. ................. 166/303 |
| 4,344,485 A | 8/1982 | Butler ........................... 166/271 |

(Continued)

FOREIGN PATENT DOCUMENTS

| CA | 1304287 | 6/1992 | ............. E21B 43/24 |
| CA | 2323029 | 4/2001 | ............. E21B 43/24 |

(Continued)

OTHER PUBLICATIONS

ASTM—Designation: D971-12 "Standard Test Method for Interfacial Tension of Oil Against Water by the Ring Method," *ASTM International*, 2014.

(Continued)

*Primary Examiner* — Zakiya W Bates
(74) *Attorney, Agent, or Firm* — ExxonMobil Upstream Research Company Law Dept.

(57) ABSTRACT

A method of recovering heavy oil from a subterranean reservoir. The method includes injecting steam into a subterranean reservoir to heat heavy oil in the subterranean reservoir and thereby produce heavy oil of reduced viscosity; injecting a multi-purpose agent into the subterranean reservoir; and producing the heavy oil of reduced viscosity from the subterranean reservoir after injecting the steam and the multi-purpose agent. The multi-purpose agent comprises an ester of the formula $R_xCOOR_y$ wherein $R_x$ is a straight chained or branched alkyl group having 1 to 8 carbon atoms, $R_y$ is a straight chained or branched alkyl group having 1 to 12 carbon atoms, C is carbon and O is oxygen.

30 Claims, 2 Drawing Sheets

(56) References Cited

U.S. PATENT DOCUMENTS

2009/0090658 A1* 4/2009 Burkus .................. C10G 1/047
208/390
2009/0188661 A1* 7/2009 Bizon ..................... E21B 43/12
166/52

FOREIGN PATENT DOCUMENTS

| CA | 2342955 | 4/2002 | ............. E21B 43/24 |
| CA | 2791492 | 3/2013 | ............. E21B 43/24 |

OTHER PUBLICATIONS

ASTM—Designation: D1331-11 "Standard Test Methods for Surface and Interfacial Tension of Solutions of Surface-Active Agents," *ASTM International*, 2014.

ASTM—Designation: D3825-09 "Standard Test Method for Dynamic Surface Tension by the Fast-Bubble Technique," 2014, *ASTM International*.

Zhihong, Lio et al. (2012) "Reservoir Simulation Modeling of the Mature Cold Lake Steaming Operations," *Soc. of Petroleum Engineers, SPE 160491*, Calgary, AB, Canada Jun. 12-14, 2012.

* cited by examiner

RECOVERY FROM A HYDROCARBON RESERVOIR

CROSS-REFERENCE TO RELATED APPLICATIONS

This application claims priority from Canadian Patent Application number 2,837,646 which was filed on 19 Dec. 2013, which is incorporated herein by reference.

FIELD

The present disclosure relates to harvesting hydrocarbon resources from underground formations. More particularly, the present disclosure relates to harvesting hydrocarbon resources by steam-based heavy oil production processes.

BACKGROUND

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as including admissions of prior art.

Modern society is greatly dependent on the use of hydrocarbons for fuels and chemical feedstocks. Hydrocarbons are generally found in subsurface rock, soil or sand formations that can be termed "reservoirs." Removing hydrocarbons from reservoirs depends on numerous physical properties of the reservoirs, such as the permeability of the formations containing the hydrocarbons, the ability of the hydrocarbons to flow through the formations, and/or the proportion of hydrocarbons present, among other things.

Easily produced sources of hydrocarbons are dwindling, leaving less conventional sources to satisfy future energy needs. As the costs of hydrocarbons increase, less conventional sources become economically attractive to produce. For example, the production of oil sands has become more economical. The hydrocarbons produced from less conventional sources may have relatively high viscosities, for example, ranging from 1000 centipoise to 20 million centipoise with API (American Petroleum Institute) densities ranging from 8° API, or lower, up to 20° API, or higher. The hydrocarbons harvested from less conventional sources may include bitumen, or other carbonaceous materials, collectively referred to herein as "heavy oil." The hydrocarbons produced from less conventional sources are difficult to recover using conventional techniques.

Several methods have been developed to recover heavy oil from, for example, oil sands. Strip or surface mining may be performed to access oil sands. Once accessed, the oil sands may be treated with hot water or steam to recover the heavy oil. For formations where heavy oil is not close to the Earth's surface, heat may be added and/or dilution may be used to reduce the viscosity of the heavy oil and recover the heavy oil. Heat may be supplied through a heating agent like steam. The recovered heavy oil may or may not be produced via a production well or wellbore. The production well or wellbore may be the same as the wellbore used to inject the heat for the steam injection. If the heating agent is steam, the steam may condense to water at the steam/cooler-oil-sands (SCO) interface in the formation and supply latent heat of condensation to heat the heavy oil in the oil sands, thereby reducing viscosity of the heavy oil and causing the heavy oil to flow more easily.

A number of steam-based heavy oil processes have been developed for recovering heavy oil. The processes may include, for example, cyclic steam stimulation (CSS), steam flooding, steam-assisted gravity drainage (SAGD), and solvent-assisted steam-assisted gravity drainage (SA-SAGD).

CSS may or may not raise a steam injection pressure above a formation fracturing pressure to create fractures within the formation and enhance a surface area to allow access of the steam to the heavy oil. Steam may increase a temperature of the heavy oil during a heat-soak phase, thereby lowering a viscosity of the heavy oil. The injection well may be used to produce the heavy oil. The cycle of soalking and producing may be repeated until the cost of injecting steam becomes uneconomical. For instance, steam from successive steam injection cycles may re-enter earlier created fractures and, thus, the process becomes less efficient over time. CSS may be practiced in horizontal or vertical wells. CSS processes are described in U.S. Pat. No. 3,292,702, and U.S. Pat. No. 3,739,852, among others.

Steam flooding is a process in which steam is injected from a series of vertical well injectors or horizontal well injectors and heavy oil is heated and pushed towards a series of vertical producer wells or horizontal producer wells. Steam flooding can be used as a late life process after a CSS operation. Steam flooding in late life is essentially a gravity drainage process. Solvent can be injected with steam to enhance the steam flooding. Further details may be obtained, for example, from Zhihong Liu and Shane D. Stark, "Reservoir Simulation Modelling of the Mature Cold Lake Steaming Operations," Society of Petroleum Engineers, SPE 160491, presented in Calgary, Alberta, 12-14 Jun., 2012.

SAGD is a process where two horizontal wells may be completed in the reservoir. The two wells may be first drilled vertically to different depths within the reservoir. Thereafter, using directional drilling technology, the two wells may be extended in the horizontal direction that results in two horizontal wells, each vertically spaced from, but otherwise vertically aligned with, the other. Ideally, the production well may be located above the base of the reservoir but as close as practical to the base of the reservoir, and the injection well may be located vertically 10 to 30 feet (3 to 10 meters) above the horizontal production well. The upper horizontal well may be utilized as an injection well and may be supplied with steam from the surface. The steam may rise from the injection well, permeating through the reservoir to form a vapor chamber (steam chamber). As the vapor chamber grows over time towards the top of the reservoir, the steam may condense at the SCO interface, releasing latent heat of steam and, thereby reducing the viscosity of the heavy oil in the reservoir. The heavy oil and condensed steam may then drain downward through the reservoir under the action of gravity and flow into the lower production well, from where the heavy oil and condensed steam can be pumped to the surface. At the surface of the well, the condensed steam and heavy oil may be separated, and the heavy oil may be diluted with appropriate light hydrocarbons for transportation by pipeline. SAGD processes are described in Canadian Patent No. 1,304,287 and in U.S. Pat. No. 4,344,485.

In steam-based heavy oil processes, the water from condensed steam and the heavy oil may compete with each other while flowing through the pore space of the reservoir to reach the production well. A high interfacial tension (IFT) between water and heavy oil may adversely affect the heavy oil recovery. IFT reducing agents have been proposed to be injected with the steam. Such IFT reducing agents are often high boiling liquids that do not vaporize and therefore do not travel with steam easily and condense where they need to, i.e. at the SCO interface, for the greatest effect.

Heavy oil diluting agents may be injected into the formation with steam to vaporize and condense with the steam at the SCO interface to reduce the viscosity of the heavy oil by dilution. Methods employing heavy oil diluting agents in combination with steam are commonly referred to as SA-SAGD. Examples of such heavy oil diluting agents are individual alkanes, mixtures of alkanes, and gas plant condensates (mixtures of alkanes, aromatic hydrocarbons, and naphthenes). Such diluting agents lack IFT reducing capability and have lower latent heats of condensation than steam. As such, the heavy oil diluting agents do not deliver as much heat to the SCO interface upon condensation. The heavy oil diluting agents also are deficient in suitable Hansen Solubility Parameters that can be used to assess if one material will dissolve in another and form a solution.

Heavy oil diluting agents and IFT reducing agents have been regarded as two distinct species of compounds in the past and have been used independently for their desired effects. For example, Canadian Patent No. 2,323,029 discloses the use of heavy oil diluting agents with the steam. Suitable additives are said to be C1 to C25 hydrocarbons and combinations thereof. While such additives may have an ability to dilute heavy oils, they do not have significant IFT reducing ability. Canadian Patent No. 2,342,955 discloses a laser-based CSS process (LASER CSS) that involves mixing liquid hydrocarbons into the injected steam, but the heavy oil diluting agents have little IFT reducing ability.

The teachings of all of the patent and non-patent documents identified and referred to above are specifically incorporated into this disclosure by reference.

There is a need for improved or alternative agents to employ with steam-based thermal recovery processes.

SUMMARY

A method of recovering heavy oil from a subterranean reservoir comprises injecting steam into a subterranean reservoir to heat heavy oil in the subterranean reservoir and produce heavy oil, the heavy oil in the subterranean reservoir having a first viscosity and the heavy oil produced having a reduced viscosity that is lower than the first viscosity, injecting a multi-purpose agent into the subterranean reservoir, and producing the heavy oil of reduced viscosity from the subterranean reservoir after injecting the steam and the multi-purpose agent. The multi-purpose agent comprises an ester of the formula $R_xCOOR_y$, wherein $R_x$ is a straight chained or branched alkyl group having 1 to 8 carbon atoms, $R_y$ is a straight chained or branched alkyl group having 1 to 12 carbon atoms, C is carbon and O is oxygen.

A method of starting-up a steam assisted gravity drainage process for recovery of heavy oil from a heavy oil containing reservoir, comprises providing wellbores in the heavy oil containing reservoir constructed and arranged for steam-assisted gravity drainage, and, until fluid communication is achieved between the wellbores, injecting steam and a multi-purpose agent into the heavy oil containing reservoir via at least one of the wellbores. The multi-purpose agent comprises an ester of a formula $R_xCOOR_y$, wherein $R_x$ is a straight chained or branched alkyl group having 1 to 8 carbon atoms, $R_y$ is a straight chained or branched alkyl group having 1 to 12 carbon atoms, C is carbon and O is oxygen.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1A:
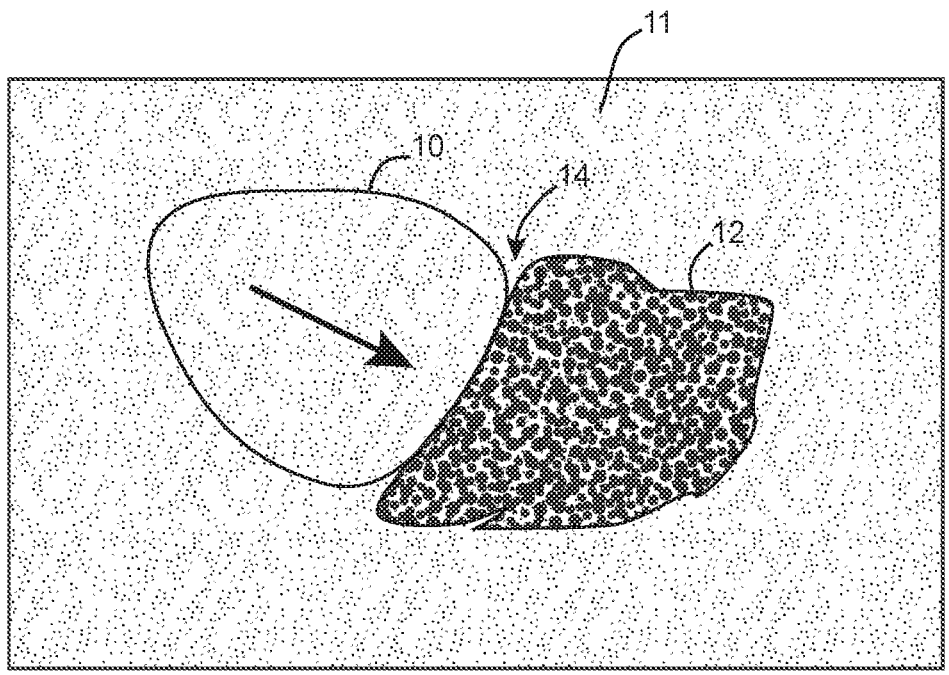
FIG. 1A and FIG. 1B are schematic diagrams illustrating a steam-based heavy oil recovery method.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of: 19 weight (wt.) % aliphatics (which can range from 5 wt. %-30 wt. %, or higher); 19 wt. % C5-asphaltenes (which can range from 5 wt. %-30 wt. %, or higher); 30 wt. % aromatics (which can range from 15 wt. %-50 wt. %, or higher); 32 wt. % resins (which can range from 15 wt. %-50 wt. %, or higher); and some amount of sulfur (which can range in excess of 7 wt. %). In addition, bitumen may contain some water and nitrogen compounds ranging from less than 0.4 wt. % to in excess of 0.7 wt. %. Metals, while small in amounts, must be removed to avoid contamination of the product synthetic crude oil. Nickel can vary from less than 75 ppm (parts per million) to more than 200 ppm. Vanadium can range from less than 200 ppm to more than 500 ppm. The percentage of the hydrocarbon types found in bitumen can vary.

As used herein, a pressure "cycle" (e.g. as used in CSS) represents a sequential increase to peak operating pressure in a reservoir, followed by a release of the pressure to a minimum operating pressure. The elapsed time between two periods of peak operating pressure does not have to be the same between cycles, nor do the peak operating pressures and minimum operating pressures.

As used herein, two locations in a reservoir are in "fluid communication" when a path for fluid flow exists between the locations. For example, fluid communication between an injection well and a production well can allow mobilized material to flow down to the production well for collection and production. As used herein, a fluid includes a gas or a liquid and may include, for example, a produced or native reservoir hydrocarbon, an injected mobilizing fluid, or water, among other materials.

"Heavy oil" includes oils which are classified by the American Petroleum Institute (API), as heavy oils, extra heavy oils, or bitumens. Thus the term "heavy oil" includes bitumen or other carbonaceous material and should be regarded as such throughout this description. Heavy oil may have a viscosity of about 1,000 centipoise (cP) or more, 10,000 cP or more, 100,000 cP or more, or 1,000,000 cP or more. In general, a heavy oil has an API gravity between 22.30 (density of 920 kg/m$^3$ or 0.920 g/cm$^3$) and 10.00 (density of 1,000 kilogram per meter cubed (kg/m$^3$) or 1 gram per meter cubed (g/cm$^3$)). An extra-heavy oil, in general, has an API gravity of less than 10.00 (density greater than 1,000 kg/m$^3$ or greater than 1 g/cm$^3$). For example, a source of heavy oil includes oil sands or bituminous sands, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker and therefore directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in heavy oil or in oil sands. However, the techniques described herein are not limited to heavy oils, but may also be used with any number of other reservoirs to improve gravity drainage of liquids. Hydrocarbon compounds may be aliphatic or aromatic, and may be straight chained, branched, or partially or fully cyclic.

"Permeability" is the capacity of a rock or other structure to transmit fluids through the interconnected pore spaces of the structure. The customary unit of measurement for permeability is the milliDarcy (mD).

"Pressure" is the force exerted per unit area by the gas on the walls of the volume. Pressure may be shown in this disclosure as pounds per square inch (psi), kilopascals (kPa) or megapascals (MPa). Unless otherwise specified, the pressures disclosed herein are absolute pressures, i.e. the sum of gauge pressure plus atmospheric pressure (generally 14.7 psi at standard conditions).

As used herein, a "reservoir" is a subsurface rock, sand or soil formation from which a production fluid, or resource, can be harvested. The formation may include sand, granite, silica, carbonates, clays, and organic matter, such as heavy oil (e.g. bitumen), oil, gas, or coal, among others. Reservoirs can vary in thickness from less than one foot (0.3048 meter) to hundreds of feet (hundreds of meter). The resource is generally a hydrocarbon, such as a heavy oil impregnating a sand bed.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. When a compound is indicated as "removed" or "substantially removed" from a mixture of compounds, it should be understood that there may remain such an amount of the compound in the mixture that cannot be removed by the technique employed for removal. For example, fractionation may leave small amounts or traces of a compound intended to be removed.

As used herein, "steam-based heavy oil recovery processes" include any type of a hydrocarbon recovery process that uses steam as a heat source to enhance the recovery, for example, by lowering the viscosity of a hydrocarbon. These processes may use injected mobilizing steam, either wet steam or dry steam, in admixture with solvents, to lower the viscosity of the hydrocarbon. Such processes may include subsurface processes, such as cyclic steam stimulation (CSS), cyclic solvent stimulation, steam flooding, solvent injection, SAGD, and SA-SAGD among others.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "well," when referring to an opening in the formation, may be used interchangeably with the term "wellbore." Further, multiple pipes may be inserted into a single wellbore, for example, as a liner configured to allow flow from an outer chamber to an inner chamber.

When referring to an ability of a multi-purpose agent to dilute heavy oil, what is meant is that the multi-purpose agent is able to mix fully with or dissolve completely within the heavy oil when mixed in a particular ratio of the multi-purpose agent to the heavy oil. The effect of such dilution is to reduce the viscosity of the heavy oil so that the heavy oil may flow, or be caused to flow, from a subterranean reservoir containing the heavy oil.

The term "solvent" as used herein is defined as an agent that dilutes or dissolves heavy oil and reduces its viscosity. Many of the prior art "solvents" (PAS) used for heavy oil recovery, such as single alkanes, mixtures of alkanes and gas plant condensates, are not solvents of heavy oil according to a narrow definition of the term solvent, i.e. an agent that completely dissolves all components of a solute below its solubility limit concentration. The PAS do not dissolve the asphaltene component of heavy oils, even in small relative amounts of the heavy oil solute. Nevertheless, the PAS dilute heavy oil by dissolving at least some constituents of the heavy oil and hence may be called diluents. Other agents such as xylene and toluene are solvents according to the narrow definition of solvents, as they dissolve all components of the heavy oil up to the solubility limit concentration. The term "solvent" as used herein includes both the narrow definition of solvents and diluents, thereby referring to the PAS, as this is the meaning of the term generally understood in this art. Moreover, when reference is made to an agent "dissolving in" heavy oil up to a particular limit, this will include the dilution of heavy oil with those agents that are not solvents according to the narrow definition, up to the limit of miscibility of the agent with the heavy oil.

Hansen Solubility Parameters (HSP) are described, for example, in the *Hansen Solubility Parameters: A User's Handbook*, by Charles M. Hansen, CRC Press, Taylor & Francis Group LLC, ISBN 10:0-8493-7248-8, 2007 (the disclosure of which is incorporated herein by reference). Materials having similar HSP values have a high affinity for each other. There are three major interactions in common organic materials, i.e. nonpolar (dispersive) interactions, permanent dipole (polar) interactions and hydrogen bonding. Specifically, for HSP, each molecule is assigned three Hansen parameters as follows, each generally measured in mega-Pascals ($MPa^{0.5}$) at 25° Celsius (C):

$\delta_d$ the energy from dispersion forces between molecules (usually referred to by the letter "D");

$\delta_p$ the energy from dipolar intermolecular force between molecules (usually referred to by the letter "P"); and $\delta_h$ the energy from hydrogen bonds between molecules (usually referred to by the letter "H").

For common chemicals, the values of D, P and H are known. For mixtures of chemicals, HSP values may be ascribed to the mixtures themselves and are calculated from the values for the individual chemicals on a volume-averaged basis. In other words, the volume averaged basis may be defined as the weighted average of the individual HSP values according to the respective volume percent of each solvent. The amount of individual HSP values used to determine the weighted average could be any amount of HSP values. For example, the amount of individual HSP values used to determine the weighted average could be based on 2 or more HSP values.

The present disclosure provides a method of recovering heavy oil from a subterranean reservoir. The method may comprise injecting steam into the subterranean reservoir to heat heavy oil in the subterranean reservoir and produce heavy oil, injecting a multi-purpose agent into the subterranean reservoir and producing the heavy oil from the subterranean reservoir after injecting the steam and the multi-purpose agent. The heavy oil in the subterranean reservoir may have a first viscosity. The heavy oil produced may have a reduced viscosity. The reduced viscosity may be a lower viscosity than the first viscosity.

The present disclosure also provides a method of starting-up a steam assisted gravity drainage process for recovering heavy oil from a heavy oil containing reservoir. The heavy oil containing reservoir may be interchangeably referred to as a subterranean reservoir and vice versa. The method of starting-up may comprise providing wellbores in the heavy oil containing reservoir that are constructed and arranged for steam-assisted gravity drainage. For example, the wellbores may be constructed and arranged as the wellbores previously described in conjunction with the steam-assisted gravity drainage process. The method of starting-up may also comprise injecting steam and a multi-purpose agent into the heavy oil containing reservoir via one of the wellbores until fluid communication is achieved between the wellbores. Once fluid communication is achieved, steam may be injected into the heavy oil containing reservoir. Once fluid communication is achieved, the starting-up phase of the steam assisted gravity drainage process may be complete.

The multi-purpose agent may be used in any steam-based thermal recovery process. The steam-based thermal recovery process may comprise cyclic steam stimulation. The steam-based thermal recovery process may comprises steam flooding. The steam-based thermal recovery process may comprise steam-assisted gravity drainage. The steam-based thermal recovery process may comprise solvent-assisted steam-assisted gravity drainage.

The multi-purpose agent may have more than one beneficial property and that may be referred to as a multi-purpose agent. The multi-purpose agent may comprise an ester. The ester may comprise the formula of $R_xCOOR_y$. $R_x$ may be a straight chained or branched alkyl group having 1 to 8 carbon atoms. $R_x$ may have 1 to 4 carbon atoms. $R_x$ may be a methyl group. $R_y$ may be a straight chained or branched alkyl group having 1 to 12 carbon atoms. $R_y$ may have 1 to 8 carbon atoms. C may be carbon. O may be oxygen. The multi-purpose agent may comprise ester as a single compound, e.g. n-propyl acetate ester, or as a mixture of esters.

The multi-purpose agent may be selected for its ability to dilute heavy oil to reduce the viscosity of the heavy oil. The multi-purpose agent may be selected for its ability to reduce interfacial tension between water and heavy oil. The multi-purpose agent may possess Hansen Solubility Parameters that enable a mixture of steam and the multi-purpose agent to penetrate into a heavy-oil containing reservoir faster than a mixture of steam and n-heptane (n-heptane is considered to have properties similar to those of gas plant condensates commonly used for heavy oil recovery). The multi-purpose agent may have a high latent heat of condensation to deliver heat to the SCO. The multi-purpose agent may have a boiling point close to that of water itself (100° C. at one atmosphere pressure). The multi-purpose agent may be at least partially soluble in water and/or heavy oil. The multi-purpose agent may improve heavy oil production rates. The multi-purpose agent may be used to reduce steam-to-heavy oil ratios.

Steam-based thermal recovery processes may have a start-up phase, during which steam is injected into the reservoir to achieve preliminary heating or fluid communication between wellbores, and an operational phase, during which steam is continuously or repeatedly injected into the reservoir heavy oil and is continuously recovered. The multi-purpose agent may be used to reduce start-up time in the start-up phase for the steam-based heavy oil processes. All of the aforementioned characteristics (i.e., useful properties) of the multi-purpose agent are useful in a start-up phase. The multi-purpose agent may be injected into the reservoir only during the start-up phase, only during the operational phase, or during the start-up phase and the operational phase. If the latter (during the start-up and operational phases), the multi-purpose agent employed in the start-up and operational phases may be the same multi-purpose agent or may be a different multi-purpose agent.

Since the multi-purpose agent may exhibit two or more useful properties for steam-based heavy-oil recovery processes, the multi-purpose agent may be used alone. If the multi-purpose agent is used alone, it is used without other compounds or mixtures exhibiting only one of such useful properties. If the multi-purpose agent is used alone, it is used without hydrocarbon diluents for heavy oil. Thus, one multi-purpose agent may replace two or more single-property agents, thereby simplifying the steam-based heavy-oil recovery processes and minimizing the use of chemicals.

The method may comprise diluting the heavy oil with the multi-purpose agent. The diluting may occur until a ratio of the multi-purpose agent to the heavy oil is between 1:19 to 1:1 by weight. Any of the aforementioned ranges may be within a range that includes or is bounded by any of the preceding examples The multi-purpose agent may have Hansen Solubility Parameters (HSP). The HSP may enable faster penetration of the multi-purpose agent in the heavy-oil containing reservoir. The HSP of the multi-purpose agent may be within the following ranges to enable the faster penetration:

D: 15.0-17.0
P: 2.5-10.8
H: 5.1-8.3.

The H value may be within the range of 6.5-8.3. Any of the aforementioned ranges may be within a range that includes or is bounded by any of the preceding examples.

The multi-purpose agent may have a boiling point within 140° C. of that of water at atmospheric pressure (e.g. higher or lower than that of water). The multi-purpose agent may have a boiling point closer to that of water, ie. within 60° C., 40° C., 20° C., 10° C. or 5° C. of that of water. Any of the aforementioned ranges may be within a range that includes or is bounded by any of the preceding examples. For a multi-purpose agent having a higher boiling point than water, the concentration of the multi-purpose agent in the mixture with steam will be increasingly limited as the boiling point rises, but may still be effective.

The multi-purpose agent may have an effect of reducing interfacial tension between water and heavy oil by at least 50%. The reduction of interfacial tension may be determined by a standard test such as anyone of the applicable tests referred to in ASTM D971-12, ASTM D1331-11 or ASTM D3825-09.

The solubility of the multi-purpose agent in water may be up to about 10 wt. % at room temperature (e.g., around 21° C.) and atmospheric pressure. The miscibility or solubility of the multi-purpose agent in heavy oil may be at least about 20 wt. % at room temperature and atmospheric pressure. Any of the aforementioned ranges may be within a range that includes or is bounded by any of the preceding examples.

The multi-purpose agent may have a latent heat of condensation of at least about 380 kJ/kg. The latent heat of the multi-purpose agent may be at least about 20% higher than that of n-heptane (n-C7) at 318 kJ/kg. Any of the aforementioned ranges may be within a range that includes or is bounded by any of the preceding examples. The latent heat of condensation of the multi-purpose agent may be more effective than n-heptane in transferring heat to the heavy oil upon condensation.

The multi-purpose agent may contain ethers as well as esters.

An example of an ester suitable as a multi-purpose agent according to this disclosure is the compound n-propyl acetate ester (PAE). The compound PAE is readily available commercially from many sources and has the formula shown below:

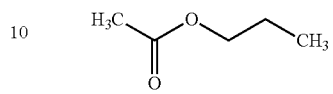

The structure of PAE is such that one part of it is hydrophobic and thus oil-soluble (the right hand side as shown) and the other part is hydrophilic and thus at least partially water-soluble (the left hand side as shown), making it effective as a surfactant. PAE has a boiling point of 101.5° C. (very close to that of water), which allows the multi-purpose agent to be carried as a vapor with steam to the SCO interface, condense at the interface, dilute the heavy oil, and reduce the IFT between the condensed steam and the diluted bitumen.

PAE is slightly soluble in water (about 1.8 wt. % solubility at atmospheric pressure and 20° C.). PAE is a good diluent for bitumen and is effective as a surfactant that reduces the IFT between bitumen and water.

Figure 2:
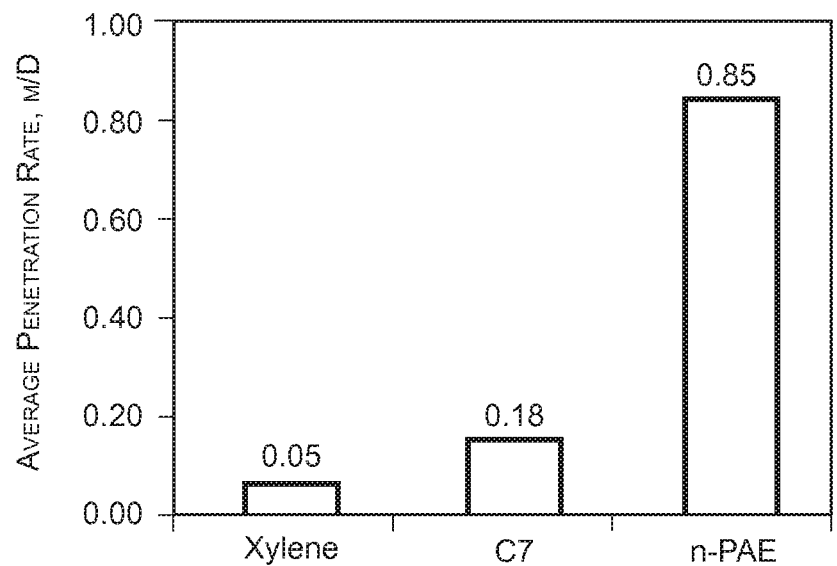
FIG. 2 and FIG. 3 are graphs comparing a multi-purpose agent with other possible additives for steam-based recovery methods.
Figure 3:
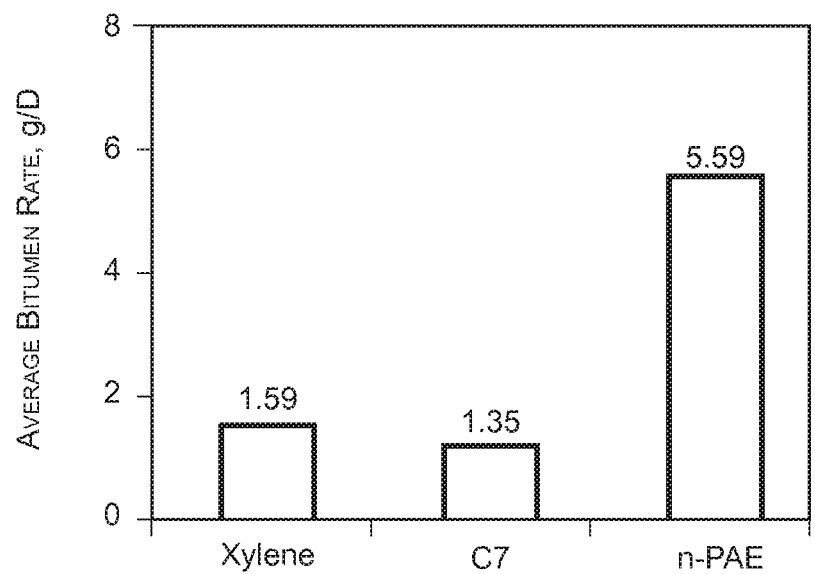

The molecular weight of PAE is 100, which is close to the average molecular weight of a gas plant condensate (GPC). Its boiling point is also close to the average boiling point of a gas plant condensate. The HSP values of PAE (D=15.3, P=4.3 and H=7.6) are such that the compound is able to penetrate oil sands more quickly (e.g. as shown in FIG. 2 described later) and produce more heavy oil per unit time (e.g. as disclosed in FIG. 3 described later) than non-multi-purpose agents, such as solvents including xylene and heptane.

The latent heat of PAE is 33% higher than that of n-heptane and many other prior art solvents or diluents, allowing it to carry significantly more heat and release it upon condensation at the SCO interface to heat the heavy oil.

Table 1 below lists the properties of n-PAE and its positive effects on heavy oil extraction used, for example, in SAGD or SA-SAGD.

TABLE 1

| PAE Properties | Positive Effects on Bitumen Extraction |
|---|---|
| Boiling Point (B.P. close to that of water (101.5° C. vs. 100° C.) | Carried with and condenses with steam |
| Viscosity close to that of GPC diluent | Reduces bitumen viscosity |
| Soluble in bitumen | Dilutes bitumen |
| Low solubility in water | Less loss in reservoir water |
| Reduces IFT between water and bitumen | Acts as a surfactant |
| 33% higher heat of vaporization than normal (straight-chain) heptane (n-C7) | Carries more latent heat than n-C7 |
| Safety Health Environment-friendly MSDS (used as a food flavour) | Safe to use with proper handling |
| Price not prohibitive | Competitive with diluents previously used |
| Favorable Hansen Solubility Parameters | Penetrates oil sands faster than n-C7 or xylene Recovers more oil than n-C7 (rate and recovery) Hastens SAGD or SA-SAGD start-up phase |

Other esters that may be employed alone or in combination with each other or with PAE as multi-purpose agents according to the present disclosure, include the esters shown in Table 2 below.

TABLE 2

| ACETATE | FORMULA | Chemical Abstracts Reference No. (CAS RN) | B.P. °C. |
|---|---|---|---|
| Methyl acetate | $CH_3COOCH_3$ | 79-20-9 | 57-58 |
| Ethyl acetate | $CH_3COOC_2H_5$ | 141-78-6 | 76.5-77.5 |
| Propyl acetate | $CH_3COOCH_2CH_2CH_3$ | 109-60-4 | 101-102 |
| Isopropyl acetate | $CH_3COOCH(CH_3)_2$ | 108-21-4 | 89 |
| Butyl acetate | $CH_3COO(CH_2)_3CH_3$ | 123-86-4 | 124-126 |
| Isobutyl acetate | $CH_3COOCH_2CH(CH_3)_2$ | 110-19-0 | 115-117 |
| Amyl acetate | $CH_3COO(CH_2)_4CH_3$ | 628-63-7 | 149 |
| Isoamyl acetate | $CH_3COOCH_2CH_2CH(CH_3)_2$ | 123-92-2 | 142 |
| Hexyl acetate | $CH_3COO(CH_2)_5CH_3$ | 142-92-7 | 170-172 |
| Heptyl acetate | $CH_3COO(CH_2)_6CH_3$ | 112-06-1 | 192-193 |
| Octyl acetate | $CH_3COO(CH_2)_7CH_3$ | 112-14-1 | 205-211 |
| Nonyl acetate | $CH_3COO(CH_2)_8CH_3$ | 143-13-5 | 212 |
| Decyl acetate | $CH_3COO(CH_2)_9CH_3$ | 112-17-4 | 272 |
| Undecenyl acetate | $CH_3COO(CH_2)_{10}CH_3$ | 112-19-6 | 269-271 |
| Lauryl acetate | $CH_3COO(CH_2)_{11}CH_3$ | 112-66-3 | 265 |

As mentioned earlier, while such esters may be used alone or in combinations as multi-purpose agents in admixture with steam without compounds of other kinds, it may be useful in some cases to use such esters in mixtures with ethers as multi-purpose agents. An example of an ether is an ether of the following formula:

$R_xOR_y$ $R_x$ may be a straight chained or branched alkyl group having 1 to 8 carbon atoms. $R_y$ may be a straight chained or branched alkyl group having 1 to 12 carbon atoms. $R_y$ have 1 to 8 carbon atoms O may be oxygen.

Ethers with relatively high polarity and low hydrogen bonding and a wide range of boiling points may offer the right combination suitable for a particular reservoir or a recovery process. Examples of suitable ethers are shown in Table 3 below.

TABLE 3

| Ether | FORMULA | CAS RN | B.P. °C. |
|---|---|---|---|
| Dimethyl Ether | $CH_3OCH_3$ | 115-10-6 | −24 |
| Methyl ethyl ether | $CH_3OCH_2CH_3$ | 540-67-0 | 7.4 |
| Diethyl ether | $CH_3CH_2OCH_2CH_3$ | 60-29-7 | 34.6 |
| Diisopropyl ether | $CH_3HCOCHCH_3CH_3$ | 108-20-3 | 69 |
| Dipropyl ether | $CH_3CH_2CH_2OCH_2CH_2CH_3$ | 111-43-3 | 90 |
| Methyl butyl ether | $CH_3OCH_2CH_2CH_2CH_3$ | 628-28-4 | 55.2 |
| Ethyl butyl ether | $CH_3CH_2O(CH_2)_3CH_3$ | 628-81-9 | 92.2 |
| Diisobutyl ether | $CH_3CH_3CHCH_2OCH_2CHCH_3CH_3$ | 628-55-7 | 122 |
| Dibutyl ether | $CH_3(CH_2)_3O(CH_2)_3CH_3$ | 142-96-1 | 142 |
| Dipentyl ether | $CH_3(CH_2)_4O(CH_2)_4CH_3$ | 693-65-2 | 187 |

In general, ethers having the following HSP values may be suitable:
D: 14.5-16.0
P: 2.5-7.0
H: 3.0-6.0.
The ratio of esters to ethers in such mixtures may be in the range of 10 -90 wt. % to 90-10 wt. %.

The esters and ethers disclosed herein are readily commercially available. Some of the esters and ethers are known as food flavoring agents and so are clearly environmentally friendly and suitable for injection into subterranean reservoirs. The compounds can generally be used for the purposes of the present disclosure without any modification, purification or other treatments.

The multi-purpose agent may exit the reservoir with the heavy oil. The multi-purpose agent may be recovered for re-use at the surface, e.g., by distillation or fractionation.

The multi-purpose agent may be employed in the multi-purpose agent/steam mixtures in any possible amounts but, for reasons of economy, be used in amounts of up to 50 wt. % of the multi-purpose agent/steam mixtures under ambient conditions. A useful amount may be at least 5 wt or at least 10 wt. %. Any of the aforementioned ranges may be within a range that includes or is bounded by any of the preceding examples. The multi-purpose agent may be mixed with water prior to vaporization ready for injection into a subterranean reservoir. The multi-purpose agent may be mixed (heated or unheated) with steam at a wellhead or from a location that serves more than one wellbore.

The multi-purpose agent may be injected into the reservoir separately from the steam or in admixture with the steam. The injection of a mixture of steam and a multi-purpose agent is convenient.

In steam-based heavy oil recovery processes, steam may be injected into the reservoir at high temperatures and pressures. The multi-purpose agent may be used at the temperatures and pressures conventionally employed for steam-based heavy oil recovery processes, provided there is no consequent degradation of the multi-purpose agent. The multi-purpose agent may not undergo degradation at temperatures up to at least 320° C., provided no strong acids or bases are present in the reservoir, and may be effective at even higher temperatures. The aforementioned range may be within a range that includes or is bounded by any of the preceding examples.

The multi-purpose agent may be used in conjunction with a solvent used for heavy oil recovery processes, e.g. solvents used in SA-SAGD, such as alkanes (individual or mixtures) or natural gas condensates. When the multi-purpose agent is used in conjunction with the solvent, the solvent may be injected into the subterranean reservoir before producing the heavy oil. The solvent may be different from the multi-purpose agent. The solvent may be injected into the subterranean reservoir separately from the multi-purpose agent and the steam, together with the multi-purpose agent but separately from the steam, together with the steam but separately from the multi-purpose agent, or mixed with the multi-purpose agent and the steam. The ratio of the multi-purpose agent to the solvent may be, for example, 5 to 95 wt. % of the multi-purpose agent to 95 to 5 wt. % of the solvent calculated without taking steam into account (i.e., on a steam-free basis). Any of the aforementioned ranges may be within a range that includes or is bounded by any of the preceding examples.

The multi-purpose agent may be used to accelerate fluid communication between two wells or two wellbores in heavy oil recovery processes for which such communication is required before normal heavy oil recovery can be achieved. Examples of such process are SAGD and SA-SAGD recovery processes having a start-up phase involving a period of heating of the subterranean reservoir by injecting steam or steam/solvent mixtures via an injection well. During the start-up phase, the presence of the multi-purpose agent in the steam injected via an injection well may accelerate the penetration of the steam towards a production well, thus reducing the time required to achieve fluid communication. During the start-up phase, even though there may not yet be direct fluid communication between the injection well and production well, a small amount of heavy oil may be produced and transported for use or sale. Alternatively, each well (injection or production) may be cyclically stimulated by steam or steam/solvent mixture injection into and produced from the same well.

Figure 1B:
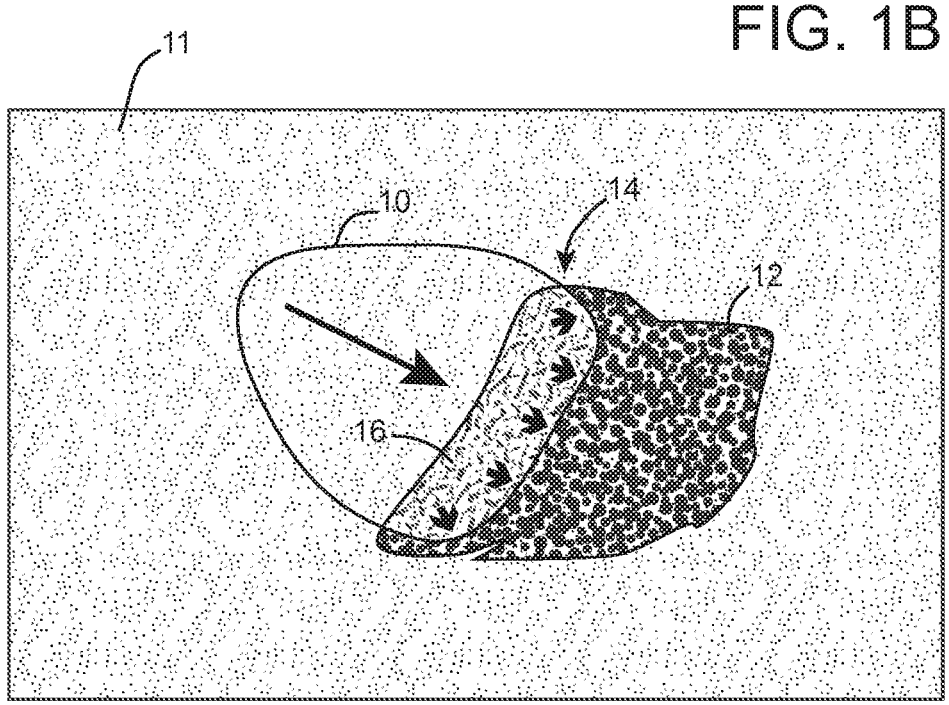

An illustration of the operation of an example of the procedures of the current disclosure is shown schematically in FIG. 1A and FIG. 1B. The illustration of FIG. 1A shows a steam chamber 10 containing steam and vapor of a multi-purpose agent injected into and moving through a sand or rock reservoir 11 in the direction of the illustrated arrow. The steam chamber 10 moves into a heavy oil containing region 12 to form an SCO interface 14 at which steam and vapor of the multi-purpose agent from steam chamber 10 condense as liquid water and liquid multi-purpose agent, respectively, and release latent heat. As shown in FIG. 1B, the condensing steam and multi-purpose agent form a heated region 16 in which the heavy oil is softened and diluted, so that the viscosity of the heavy oil is reduced and the oil is able to flow through the formation, as indicated by the small arrows. The heated region 16 contains water from condensing steam, the multi-purpose agent in condensed form and heavy oil of reduced viscosity. The multi-purpose agent, as well as the steam, may contribute latent heat of condensation. The multi-purpose agent may reduce the interfacial tension between condensed water and heavy oil. The reduced interfacial tension may make the heavy oil capable of reaching a production well sooner than if no multi-purpose agent had been used. The multi-purpose agent may dilute the heavy oil to reduce its viscosity such that the viscosity of the heavy oil that is produced is less than the viscosity of the heavy oil before it is produced. In other words, the viscosity of the heavy oil that is produced is less than the viscosity of the heavy oil before it interacts with the steam and the multi-purpose agent. The heavy oil displaced may be produced from a production well (not shown) drilled into the formation.

The multi-purpose agent may carry as much as 33% more latent heat than steam additives used in the prior art, so that a greater contribution is made to the delivery of heat to the reservoir. The multi-purpose agent may penetrate reservoirs, such as oil sands, faster than steam additives used in the prior art. As a result, the multi-purpose agent may mix with heavy oil sooner than many steam additives used in the prior art.

The following example of tests performed compares a multi-purpose agent, such as PAE, with xylene and n-heptane (C7). The example illustrates the effectiveness of PAE in increasing the average penetration rate into oil sands and the average bitumen production rate.

Xylene was chosen as a solvent for comparison because it was previously considered one of the best solvents for bitumen extraction because of its known ability to dissolve all the four bitumen constituents, namely saturates, aromatics, resin and asphaltenes. N-heptane was chosen as a diluent for comparison because it may be considered to be a surrogate for a common diluent known as gas plant condensates (GPC), because its boiling point, molecular weight, and bitumen viscosity reduction efficiency are close to those of GPC.

PAE was used as the exemplary multi-purpose agent because it has a boiling point close to that of water, and because of its ready availability, suitability to be tested under ambient conditions, and experimenter-friendly safety considerations (according to the MSDS data sheets).

The tests were performed on samples from the Athabasca oil sands from Alberta, Canada. In each test, the amount of the oil sands material and the porosity and permeability of the sand pack were the same. This was ensured by packing 24.83 g of high-grade Athabasca oil sands to a height of 4.5 cm and a volume of 15 mL in a 50 mL graduated cylinder, the bottom part of which was cut off and replaced with a welded screen to allow liquid hydrocarbon drainage, while retaining the extracted sands. In each test, 28 mL (5.3 PV) of a test solvent (diluent) was poured on top of the oil sands and allowed to flow under gravity at atmospheric pressure (101.3 KPa) and room temperature (21° C.). The top of the graduated cylinder was covered with a crumpled cleaning paper and the cylinder was placed inside a fume hood.

The solvent (diluent) penetrated the oil sands in a downward direction and the diluted bitumen dripping out of the bottom screen was collected in a weighed glass or an aluminum dish. The time at which the first drop of diluted bitumen drained out to the dish was recorded as the breakthrough time (BT). After breakthrough, the test was continued until all the solvent (diluent) penetrated the oil sands and the last drop of diluted bitumen was collected. The time from the start of solvent (diluent) breakthrough to the time the last drop of diluted bitumen collection was recorded and termed as the extraction time (ET). The solvent (diluent) from the diluted bitumen collected in the dish was removed by evaporation and the dish with the solvent-free bitumen was weighed to determine the amount of bitumen recovered by each solvent (diluent). The solvent (diluent) static head caused by solvent (diluent) density differences had negligible impact on BT and ET, as xylene, with the highest density (0.87 g/cm$^3$ at 15° C.) and hence the highest head, had the longest BT and ET. The average penetration rate (FIG. 2) for each solvent was determined by dividing the height of the sand pack by the BT and expressing it in terms of m/D. The average bitumen production rate (FIG. 3) was calculated by dividing the amount of solvent-free bitumen produced by the time of production that included both BT and ET, and expressing it in g/D.

The bench-scale gravity drainage tests under ambient conditions using PAE as the multi-purpose agent show that the multi-purpose agent has a significantly higher average penetration rate (FIG. 2) and yields a significantly higher average production rate (FIG. 3) than each of the two prior art solvents: xylene and n-heptane.

As utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described are considered to be within the scope of the disclosure.

While detailed information has been provided above, it will be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other in any effective manner.

The articles "the", "a" and "an" as used herein are not necessarily limited to mean only one, but rather are inclusive and open-ended so as to include, optionally, multiple such elements.

What is claimed is:

1. A method of recovering heavy oil from a subterranean reservoir, the method comprising:
    injecting steam into a subterranean reservoir to heat heavy oil in the subterranean reservoir and produce heavy oil, the heavy oil in the subterranean reservoir having a first viscosity and the heavy oil produced having a reduced viscosity that is lower than the first viscosity;
    injecting a multi-purpose agent into said subterranean reservoir;
    diluting the heavy oil with the multi-purpose agent until a ratio of the multi-purpose agent to the heavy oil is between 1:19 to 1:1 by weight;
    producing said heavy oil of reduced viscosity from said subterranean reservoir after injecting the steam and the multi-purpose agent;
    wherein the multi-purpose agent comprises an ester of the formula:

$R_xCOOR_y$ wherein:
    $R_x$ is a straight chained or branched alkyl group having 1 to 8 carbon atoms,
    $R_y$ is a straight chained or branched alkyl group having 1 to 12 carbon atoms,
    C is carbon, and
    O is oxygen.

2. The method of claim 1, wherein said multi-purpose agent has a Hansen Solubility Parameters within the range of:
    $\delta_d$ —the energy from dispersion forces between molecules (usually referred to by the letter "D"): 15.0-17.0
    $\delta_p$ —the energy from dipolar intermolecular force between molecules (usually referred to by the letter "P"): 2.5-10.8
    $\delta_h$ —the energy from hydrogen bonds between molecules (usually referred to by the letter "H"): 5.1-8.3.

3. The method of claim 1, wherein said multi-purpose agent is configured to reduce interfacial tension between water and said heavy oil by at least 50%.

4. The method of claim 1, wherein said multi-purpose agent has a latent heat of condensation of at least 380 kJ/kg.

5. The method of claim 1, wherein said multi-purpose agent has a solubility in water of up to about 10 wt. % at room temperature and atmospheric pressure.

6. The method of claim 1, wherein said multi-purpose agent has a boiling point within one of 140° C., 60° C., 40° C., 20° C., 10° C. and 5° C. of that of water at atmospheric pressure.

7. The method of claim 1, wherein one of $R_x$ has 1 to 4 carbon atoms and $R_x$ is a methyl group.

8. The method of claim 1, wherein $R_y$ has 1 to 8 carbon atoms.

9. The method of claim 1, wherein the multi-purpose agent comprises an ester selected from the group consisting of methyl acetate, ethyl acetate, propyl acetate, isopropyl acetate, butyl acetate, isobutyl acetate, amyl acetate, isoamyl acetate, hexyl acetate, heptyl acetate, octyl acetate, nonyl acetate, decyl acetate, undecenyl acetate, lauryl acetate, and mixtures of any two or more of the methyl acetate, the ethyl acetate, the propyl acetate, the isopropyl acetate, the butyl acetate, the isobutyl acetate, the amyl acetate, the isoamyl acetate, the hexyl acetate, the heptyl acetate, the octyl acetate, the nonyl acetate, the decyl acetate, the undecenyl acetate, and the lauryl acetate.

10. The method of claim 1, wherein said multi-purpose agent further comprises an ether of the formula:

$R_xOR_y$ wherein:
    $R_x$ is a straight-chained or branched alkyl group having 1 to 8 carbon atoms, and
    $R_y$ is a straight-chained or branched alkyl group having 1 to 12 carbon atoms, and
    O is oxygen.

11. The method of claim 10, wherein the ether has Hansen Solubility Parameters in which:
    $\delta_d$ —the energy from dispersion forces between molecules (usually referred to by the letter "D"): 14.5-16.0
    $\delta_p$ —the energy from dipolar intermolecular force between molecules (usually referred to by the letter "P"): 2.0-7.0
    $\delta_h$ —the energy from hydrogen bonds between molecules (usually referred to by the letter "H"): 3.0-6.0.

12. The method of claim 1, wherein said multi-purpose agent is injected into the subterranean reservoir in an amount up to 50 wt. % of said steam injected into the subterranean reservoir.

13. The method of claim 1, further comprising injecting a solvent into the subterranean reservoir before producing said heavy oil, wherein the solvent is different from said multi-purpose agent.

14. The method of claim 13, wherein a ratio of the multi-purpose agent to the solvent is 5 to 95 wt. % of the multi-purpose agent to 95 to 5 wt. % of the solvent calculated on a steam-free basis.

15. The method of claim 1, wherein injecting steam comprises carrying out a steam-based thermal recovery process, wherein the steam-based thermal recovery process comprises a start-up phase, the start-up phase comprising injecting the steam into the subterranean reservoir to achieve preliminary heating or fluid communication between wellbores, and an operational phase, the operational phase comprising continuously injecting the steam into the subterranean reservoir and continuously producing the heavy oil, and wherein injecting said multi-purpose agent occurs during at least one of said start-up phase and said operational phase.

16. The method of claim 15, wherein said multi-purpose agent injected into the subterranean reservoir in said start-up phase is one of the same and different from said multi-purpose agent injected into the subterranean reservoir in said operational phase.

17. A method of starting-up a steam assisted gravity drainage process for recovery of heavy oil from a heavy oil containing reservoir, the method comprising:
    providing wellbores in the heavy oil containing reservoir constructed and arranged for steam-assisted gravity drainage; and
    at least until fluid communication is achieved between the wellbores, injecting steam and a multi-purpose agent into the heavy oil containing reservoir via at least one of the wellbores;
    diluting the heavy oil with the multi-purpose agent until a ratio of the multi-purpose agent to the heavy oil is between a range of 1:19 to 1:1 by weight;
    wherein said multi-purpose agent comprises an ester of a formula:

$$R_xCOOR_y$$

wherein:
    $R_x$ is a straight chained or branched alkyl group having 1 to 8 carbon atoms,
    $R_y$ is a straight chained or branched alkyl group having 1 to 12 carbon atoms,
    C is carbon, and
    O is oxygen.

18. The method of claim 17, wherein said multi-purpose agent has a Hansen Solubility Parameters within the range of:
    $\delta_d$ —the energy from dispersion forces between molecules (usually referred to by the letter "D"): 15.0-17.0
    $\delta_p$ —the energy from dipolar intermolecular force between molecules (usually referred to by the letter "P"): 2.5-10.8
    $\delta_h$ —the energy from hydrogen bonds between molecules (usually referred to by the letter "H"): 5.1-8.3.

19. The method of claim 17, wherein said multi-purpose agent is configured to reduce interfacial tension between water and said heavy oil by at least 50%.

20. The method of claim 17, wherein said multi-purpose agent has a latent heat of condensation of at least 380 kJ/kg.

21. The method of claim 17, wherein said multi-purpose agent has a solubility in water of up to about 10 wt. % at room temperature and atmospheric pressure.

22. The method of claim 17, wherein said multi-purpose agent has a boiling point within one of 140° C., 60° C., 40° C., 20° C., 10° C. and 5° C. of that of water at atmospheric pressure.

23. The method of claim 17, wherein one of $R_x$ has 1 to 4 carbon atoms and $R_x$ is a methyl group.

24. The method of claim 17, wherein $R_y$ has 1 to 8 carbon atoms.

25. The method of claim 17, wherein the multi-purpose agent comprises an ester selected from the group consisting of methyl acetate, ethyl acetate, propyl acetate, isopropyl acetate, butyl acetate, isobutyl acetate, amyl acetate, isoamyl acetate, hexyl acetate, heptyl acetate, octyl acetate, nonyl acetate, decyl acetate, undecenyl acetate, lauryl acetate, and mixtures of any two or more of the methyl acetate, the ethyl acetate, the propyl acetate, the isopropyl acetate, the butyl acetate, the isobutyl acetate, the amyl acetate, the isoamyl acetate, the hexyl acetate, the heptyl acetate, the octyl acetate, the nonyl acetate, the decyl acetate, the undecenyl acetate, and the lauryl acetate.

26. The method of claim 17, wherein said multi-purpose agent further comprises an ether of the formula:

$$R_xOR_y$$

wherein: $R_x$ is a straight-chained or branched alkyl group having 1 to 8 carbon atoms,
    $R_y$ is a straight-chained or branched alkyl group having 1 to 12 carbon atoms, and
    O is oxygen.

27. The method of claim 26, wherein the ether has Hansen Solubility Parameters in which:
    $\delta_d$ —the energy from dispersion forces between molecules (usually referred to by the letter "D"): 14.5-16.0
    $\delta_p$ —the energy from dipolar intermolecular force between molecules (usually referred to by the letter "P"): 2.0-7.0
    $\delta_h$ —the energy from hydrogen bonds between molecules (usually referred to by the letter "H"): 3.0-6.0.

28. The method of claim 17, wherein said multi-purpose agent is injected into the heavy oil containing reservoir in an amount up to 50 wt. % of said steam injected into the heavy oil containing reservoir.

29. The method of claim 17, further comprising injecting a solvent into the heavy oil containing reservoir, wherein the solvent is different from said multi-purpose agent.

30. The method of claim 29, wherein a ratio of said multi-purpose agent to said solvent is 5 to 95 wt. % of the multi-purpose agent to 95 to 5 wt. % of the solvent calculated on a steam-free basis.

* * * * *